Jan. 10, 1950 N. A. RAMQVIST 2,494,200
ELECTRIC MACHINE
Filed Jan. 17, 1947 2 Sheets-Sheet 2
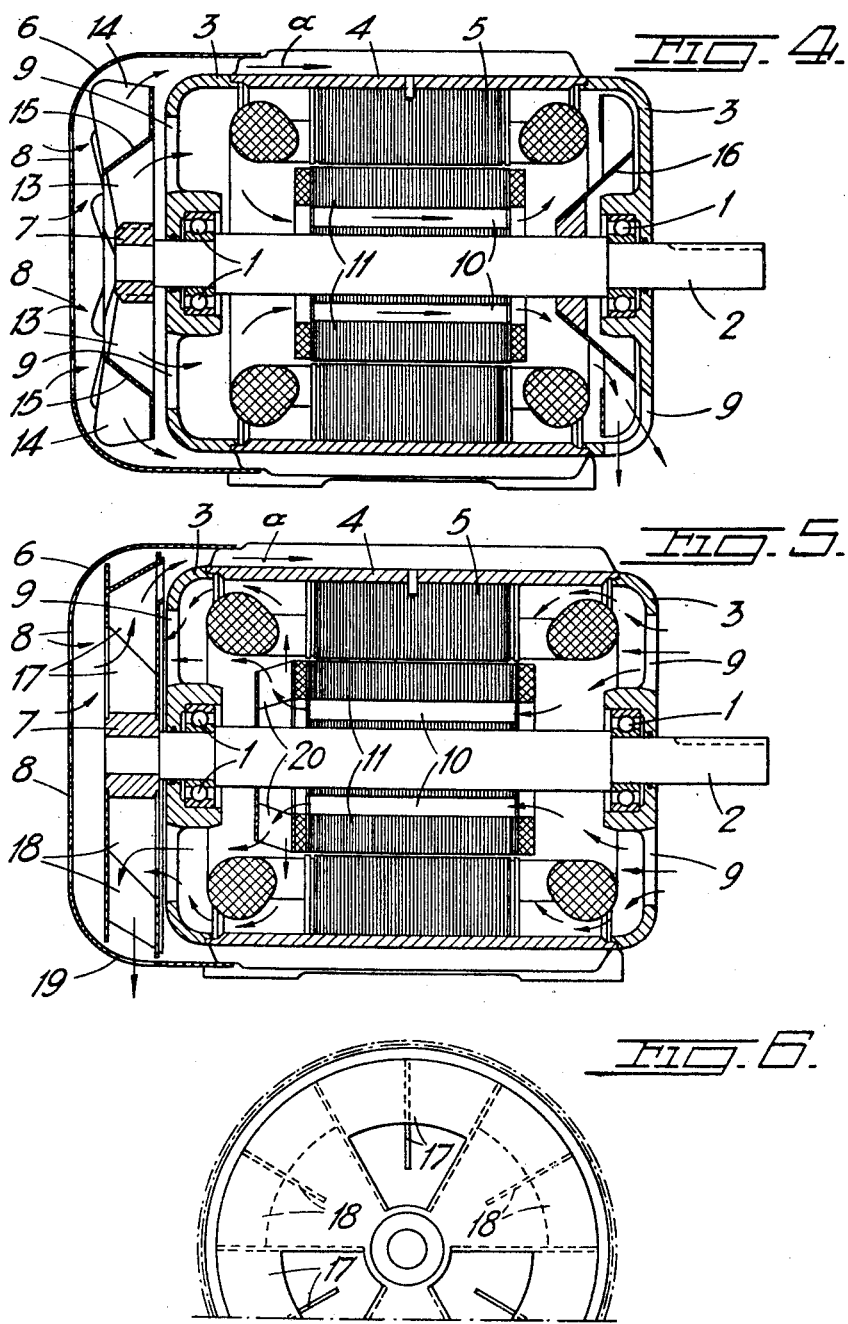
Inventor
Nils Allan Ramqvist
By Thomas H. Wells Atty.

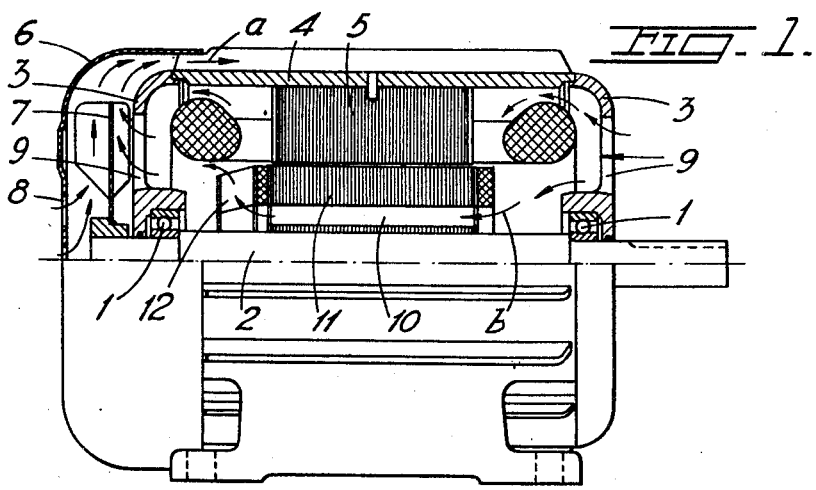
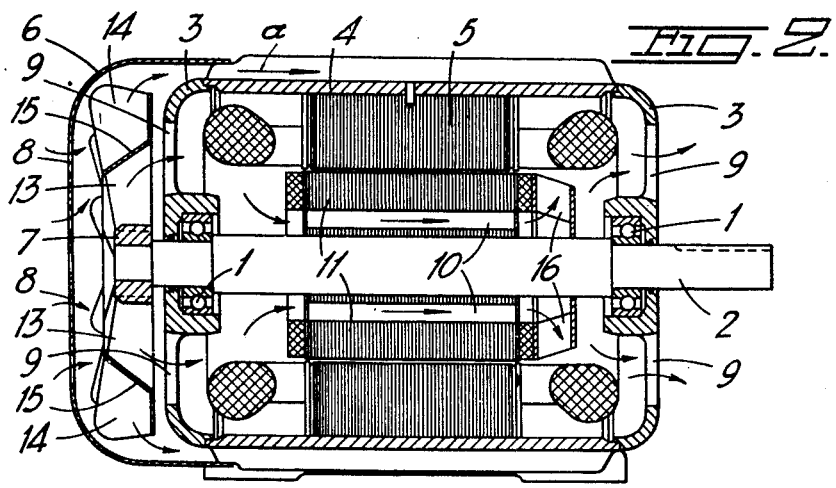
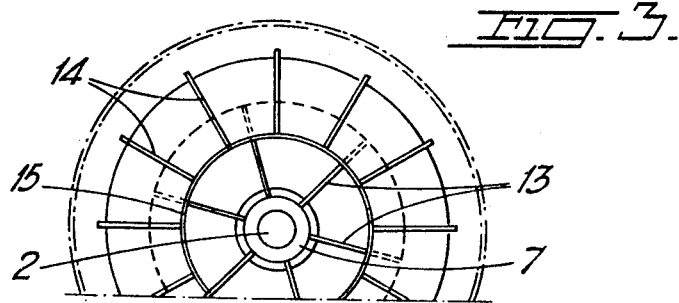
Inventor
Nils Allan Ramqvist

Patented Jan. 10, 1950

2,494,200

UNITED STATES PATENT OFFICE 2,494,200

ELECTRIC MACHINE

Nils Allan Ramqvist, Harnosand, Sweden

Application January 17, 1947, Serial No. 722,600
In Sweden February 12, 1946

2 Claims. (Cl. 171—252)

In electric machines it is, as will be known, of very great importance that the temperature rise occurring during the operation is limited as much as possible. For this purpose different systems have been used, whereby the cooling effect has been produced by means of cooling air.

The present invention relates to so-called open electric machines provided with a fan for propelling cooling air used in connection with two cooling systems, i.e. an outer and an inner one. The invention consists in the combination of plate shaped bearing shields, openings in said shields and channels through the internal parts of the machine for the air current of the inner cooling system, a chamber for the fan producing the currents, said chamber being provided between one of the bearing shields and an outer cover, in which openings are provided for the air current of the outer cooling system directed alongside the stator of the machine by means of said cover.

The air currents of the two systems need not mix together but may be kept entirely apart. The current conditions may be chosen in such a manner that the two air currents either flow in the same direction or in opposite directions.

Compared with cooling systems hitherto known the present invention has the advantage of comprising a simple construction and at the same time being highly effective, substantially owing to the fact that complicated current passages are eliminated and the air current in both cooling systems mainly flows from one side of the machine to the other without by-paths.

Some embodiments of the invention as applied to an electric motor are, by way of example, illustrated by the accompanying drawings.

Fig. 1 shows a vertical section of the first embodiment.

Fig. 2 shows a vertical section of a second embodiment.

Fig. 3 shows an end elevation of the fan in this embodiment.

Fig. 4 shows a vertical section of a third embodiment.

Fig. 5 shows in a corresponding way a fourth embodiment, and

Fig. 6 shows an end elevation of the fan in this last embodiment.

The motor casing comprises in a known manner two bearing shields 3 provided with bearings I for the motor shaft 2 and further a cooling shell or frame 4, provided with outer cooling flanges, within which frame the stator plates 5 of the motor is provided. Outside one of the bearing shields there is in any suitable manner provided a fan cover 6 as to form a chamber for a fan 7 secured to the motor shaft 2. The fan sucks in air from outside through openings 8 in the cover 6 and propels cooling air alongside the cooling frame 4 in the direction as indicated by the arrows $a$ in order to cool the frame 4. The bearing shields 3 of the motor are provided with passage openings for the cooling air of the inner cooling system, for which air current there are besides provided channels 10 in the rotor 11 of the machine. According to the embodiment shown in Fig. 1 besides the fan 7 there is provided an auxiliary fan 12, which assists in propelling the air in the direction as indicated by the arrows $b$. The air currents of the two cooling systems will thus be brought together and mix. Such a mixing of the air currents is, however, not necessary but they may be kept wholly apart. Different embodiments illustrating this are shown in Figs. 2–6.

According to the embodiment shown in Figs. 2 and 3 the fan 7 is used as a kind of a double fan with a central portion 13 for the inner cooling system and a peripherical portion 14 for the outer cooling system.

The two fan portions are separated, for instance by a bevelled or substantially bevelled wall 13. The cooling air is sucked in through the openings 8 and propelled in the same direction in the two cooling systems. Beside the fan 13, 14 there is preferably provided an auxiliary fan 16, which assists in propelling the air in the inner cooling system in order to increase its cooling effect.

The embodiment shown in Fig. 4 departs from that one shown in Figs. 2 and 3 only by that the auxiliary fan 16 is provided for driving out the air from the inner cooling system in radial or substantially radial direction. Hereby it will be possible to use a very powerful auxiliary fan in order to increase the cooling effect of the inner cooling system.

In the embodiment shown in Figs. 5 and 6 there is provided a fan 7, constructed in such a way that the suction of air for the outer cooling system and the driving out of air from the inner cooling system take place at the same end of the motor.

For this purpose the fan 7 is provided with separated pocket-like passages 17 and 18 for the two cooling systems, and the air current through the rotor travels in a direction which is opposite to the direction of travel of the air exteriorly of the motor housing. In the fan cover 6 are provided special exhaust openings 10 for the inner cooling system.

By way of clarification, it is noted that Figures 5 and 6 show a motor having a rotor 11 and a stator 5 both disposed in a housing 4. Such housing has end plates 3,3 provided with bearings 1,1 for supporting the shaft 2 of the rotor. The end plates 3,3 also have ventilating openings 9,9. An apertured cover plate 6 is secured to the housing 4 in circumferentially spaced relation thereto, such cover having a series of apertures 8 for the flow of air into the air moving device or fan 7 which is mounted on the rotor shaft externally of the housing but enclosed by said cover plate 6. As will be apparent from Figures 5 and 6, the fan 7 comprises two axially spaced discs mounted on a hub. One of said discs, which is adjacent the cover plate 6, is provided with openings equally spaced circumferentially from each other and in proximity to the hub. The other disc is provided with two sets of openings; each of the openings in one of such sets being located close to the periphery of said other disc and in radial alignment with the respective openings in said first disc, and each of the openings in said other set being located between adjacent peripheral openings and in proximity to said hub. A set of radial vanes 17 are provided to bisect the openings adjacent the hub in said first disc and the peripheral openings in said other disc. Another set of radial vanes 18 are provided to bisect the openings in said other disc. Both sets of vanes 17 and 18 are disposed between the spaced discs. The set of vanes 17 have a peripheral baffle associated therewith and in operation such vanes draw air through the apertures 8 of the cover 6, through the openings in the first disc, and impels such air, which is deflected by said peripheral baffles, through the peripheral opening in said other disc and thence through the circumferential space between the cover plate 6 and the housing 4. Simultaneously with the operation of vanes 17 as above described, the vanes 18 act to draw air through ducts 10 provided in the rotor 11, through the openings adjacent the hub in said other disc and impel such air radially outward through a different group of apertures in the cover plate 6.

The embodiments as described and shown hereinbefore are though more simple yet more effective than those before known, substantially owing to the fact that by the invention it is possible to use the most effective cooling system for a so-called surface-cooled (closed) machine, while the machine simultaneously is cooled by a direct air current passing through the machine according to the most effective cooling system for an open machine. For the air current passing through the internal parts of the machine, channels may be provided in the rotor as well as in the stator and between the stator plates and the stator housing. Besides the simple construction makes it possible to apply the invention in motors of a common commercial type as well as to alter closed machines into open ones by exchanging the bearing shields.

The invention is, of course, not limited to the application in motors only but may also be applied to generators. Furthermore the invention is not limited to the details as described and shown hereinbefore but these may be modified in any suitable manner without departing from the scope of the invention.

I claim:

1. In an electric machine having a rotor and a stator disposed within a housing which has end plates provided with bearings for the rotor shaft and with ventilating openings, the combination of an air moving device mounted externally of one of said end plates on the associated end of said rotor shaft, an apertured cover plate enclosing such air moving device and secured to said housing in circumferentially spaced relation thereto, ventilating ducts extending through said rotor, such air moving device comprising vanes and baffle means combined with the same so as provide separate groups thereof, a portion of said baffle means lies in the plane of rotation, and the remaining portion of the baffle means extends diagonally toward the rotational axis from said first mentioned portion, the one group of the vanes draws air through the apertures of the cover plate and impels such air through the circumferential space between the cover plate and housing, and the other of which draws air through the apertures of the cover plates and impels such air through the rotor ducts.

2. A machine in accordance with claim 1 in which there is provided an auxiliary impeller mounted internally of the housing on said rotor shaft.

NILS ALLAN RAMQVIST.

REFERENCES CITED

The following references are of record in the file of this patent:

UNITED STATES PATENTS

| Number | Name | Date |
|---|---|---|
| 1,476,776 | Stamm et al. | Dec. 11, 1923 |
| 1,916,339 | Smith | July 4, 1933 |
| 1,996,460 | Coates | Apr. 2, 1935 |

FOREIGN PATENTS

| Number | Country | Date |
|---|---|---|
| 16,300 | Great Britain | of 1905 |